United States Patent [19]

Pessimisis

[11] 4,444,905

[45] Apr. 24, 1984

[54] HYDROTREATING CATALYST PREPARATION AND PROCESS

[75] Inventor: George N. Pessimisis, Westchester, Ill.

[73] Assignee: Nalco Chemical Company, Oak Brook, Ill.

[21] Appl. No.: 358,522

[22] Filed: Mar. 15, 1982

Related U.S. Application Data

[63] Continuation of Ser. No. 188,708, Sep. 19, 1980, abandoned, which is a continuation of Ser. No. 63,582, Aug. 3, 1979, abandoned.

[51] Int. Cl.$^3$ .................. B01J 23/64; B01J 27/14; C10G 45/04; C10G 45/00
[52] U.S. Cl. .................. 502/211; 208/216 R; 208/217; 208/251 H; 208/254 H; 502/213
[58] Field of Search ............ 208/216 R, 216 PP, 217, 208/251 H, 254 H; 252/435, 465, 466, 470; 502/211, 213

[56] References Cited

U.S. PATENT DOCUMENTS

| | | | |
|---|---|---|---|
| 3,094,480 | 6/1963 | Richardson | 208/251 H |
| 3,167,497 | 1/1965 | Solomon | 208/254 H |
| 3,227,646 | 1/1966 | Jacobson | 208/254 H |
| 3,232,887 | 2/1966 | Pessimisis | 252/470 |
| 3,287,280 | 11/1966 | Colgan | 252/435 |
| 3,425,934 | 2/1969 | Jacobson | 208/216 PP |
| 3,686,137 | 8/1972 | Gaiti | 208/254 H |
| 3,749,664 | 7/1973 | Mickelson | 208/216 R |
| 3,817,873 | 6/1974 | Mickelson | 252/435 |
| 3,840,472 | 10/1974 | Colgan | 252/435 |
| 3,897,365 | 7/1975 | Feins et al. | 208/216 PP |

*Primary Examiner*—Gary P. Straub
*Attorney, Agent, or Firm*—Richard L. Johnston

[57] ABSTRACT

Hydrotreating catalysts are prepared using multiple impregnation and a critical ratio of VIB metal to VIII metal in one or more stages to produce catalysts which have higher than normal activity in contaminant removal from hydrocarbon feed stocks, especially in both sulfur and nitrogen removal, which catalysts also contain relatively low or no acidic residues such as $P_2O_5$ and permit use of lower effective operating temperature for a predetermined percentage of contaminant removal, for example, at 85% removal of sulfur.

6 Claims, No Drawings

HYDROTREATING CATALYST PREPARATION AND PROCESS

This is a continuation of application Ser. No. 188,708 filed Sept. 19, 1980 abandoned, which in turn is a continuation of Ser. No. 63,582 filed Aug. 3, 1979 now abandoned.

BACKGROUND

This invention relates to an improved VIB metal-VIII metal carrier catalyst suitable for hydrotreating hydrocarbon stocks.

Hydrotreating refers to the process of hydrodesulfurization, hydrodenitrogenation and demetallization of hydrocarbon feedstocks. This invention is especially directed toward the preparation of a catalytic composite having superior hydrotreating activity for the removal of sulfur and nitrogen in heavy hydrocarbon stocks. Examples of such heavy stocks are total crude oil, crude residua, atmospheric and vacuum gas oils, and cycle oils.

Crude petroleum oil, and heavy hydrocarbon fractions and/or distillates derived from crudes, contain components such as nitrogen, sulfur and metals. These impurities may exist in heteratomic compounds and are often present in relatively large quantities. Such impurities may poison or modify catalysts used in the upgrading of petroleum fractions in reforming or cracking steps. Nitrogen and sulfur are also objectionable because combustion of hydrocarbon fuels containing these impurities releases nitrogen and sulfur oxides. Such by-product gases are noxious, corrosive and present a serious problem in the field of air pollution.

The removal and/or conversion of these impurities is effectively carried out by catalytic hydrotreating, where a feedstock containing sulfur and nitrogen is contacted with a supported catalyst in the presence of hydrogen. Hydrotreating conditions may include a wide range of temperatures, pressures and space velocities as determined by the design of commercial refineries.

Supported catalysts can be generally characterized as comprising metallic components, supported on a refractory inorganic oxide carrier of synthetic or natural original and having a medium to high surface area and a well-developed pore structure. Metallic components having hydrotreating activity may include the metals of Groups VIB and VIII of the Periodic Table.

Numerous disclosures have been made for methods of preparing supported catalyst for hydrotreating. Catalytic metals may be applied to a formed or unformed carrier by one of several impregnation methods known to the art. This is usually followed by forming, if necessary, and by calcination to convert the catalytic metal compounds to oxides.

Several prior art disclosures have been proposed for preparing active hydrotreating catalysts by single impregnation techniques using acid stabilized solutions of the catalytically-active metals.

U.S. Pat. No. 3,232,887 discloses a method of impregnation of catalyst supports, in which the metals impregnating solution is stabilized with an acidic compound. The acidic stabilizer may be organic, e.g., gluconic or citric acid, or inorganic. The preferred acid is phosphoric. The acid stabilized solution contains Group VIB and Group VIII metals where, in the case of phosphoric acid, the phosphorus to Group VIB molar ratio, e.g., P/Mo, ranges from 0.25 to 2.5.

U.S. Pat. No. 3,287,280 discloses a method of preparing a hydrodesulfurization catalyst by impregnating a formed alumina support with a stabilized phosphoric acid solution of molybdenum and nickel salts. The solution contains "at least about 0.2 mole of phosphoric acid per mole of molybdenum metal" and is limited in some claims to a molar ratio of P/Mo of 0.2 to 0.8.

U.S. Pat. Nos. 3,817,873 and 3,755,196 relate to a stable metals solution, a method of preparing the same, a catalyst preparation method using the metals solution, and the resulting catalyst. The metals solution contains molybdenum, nickel and/or cobalt, and an acid containing phosphorous, having a P/Mo molar ratio of 0.1 to 0.25.

U.S. Pat. No. 3,840,472 discloses preparation of an impregnating solution where "the promoter solution of the (disclosed) invention consists essentially of molybdic oxide, at least one of the specified Group VIII metal compounds and phosphoric acid dissolved in water". The solution may contain molar ratios of P/Mo in the range 0.065 to 2.5.

In addition to the above single impregnation methods with acid stabilized solutions, the prior art discloses methods of preparing hydrotreating catalysts by multiple impregnations and/or stepwise methods, to incorporate the active metals into the formed or unformed support.

U.S. Pat. No. 3,114,701 discloses a catalytic hydrodenitrification process using a catalyst prepared by multiple impregnations of a formed alumina support with aqueous solutions of nickel nitrate and ammonium molybdate, such that the nickel content on the finished catalyst is in the range of 4–10 percent by weight and the molybdenum metal content on the finished catalyst is in the range of 19–30 percent by weight on the calcined composite.

U.S. Pat. No. 4,097,413 claims the preparation of a desulfurization catalyst by first co-mulling boehmite alumina with an aqueous ammonium molybdate solution, drying the resultant mixture, then co-mulling with a soluble cobalt salt. The mixture is then U.S. Pat. No. 4,048,115 discloses a stepwise method of preparing a desulfurization catalyst. Column 1, line 58, states that " . . . the present invention relates to a desulfurization catalyst comprising an inorganic oxide carrier material, a Group VIB metal component and a Group VIII metal component wherein said catalyst is prepared by (a) extruding at least 10% of the Group VIII metal component with the inorganic oxide carrier material, and (b) impregnating the resulting extrudate with a sufficient quantity of Group VIB and Group VIII metal components to yield a finished catalyst containing the requisite metallic component content."

OBJECTS

It is the primary object of this invention to develop a new hydrotreating catalyst and method for preparing the same. The new catalyst is an improved hydrotreating catalyst having high desulfurization and denitrogenation activity performance. The method of preparation involves a two-stage impregnation using a novel acid stabilized solution in at least one stage.

It is generally known, in the art of hydrotreating catalysis, that cobalt-promoted compositions give better desulfurization selectivity compared to nickel-promoted compositions, while the reverse is true for denitrogenation. It is a secondary object of this invention to develop a nickel-molybdenum catalyst having unexpectedly-high desulfurization activity compared to its denitrogenation.

It is also generally known in the art of hydrotreating catalysis that merely increasing the catalytic metals of any composition can eventually top out the activity effect and actually begin to give a decrease in activity at very high metals loadings. It is an object of this invention to show that the correct use of a multiple-stage impregnation can allow effective activity use of increased metals loading.

It is a further object of this invention to disclose a method of preparing a novel low-level, acid-stabilized impregnating solution.

Another object is to produce improved results in catalytic refining of hydrocarbon oils containing sulfur, nitrogen and/or metals. Other objects will appear hereinafter.

BRIEF SUMMARY OF THE INVENTION

Hydrotreating catalysts are prepared using multiple impregnation and a critical ratio of VIB metal to VIII metal in one or more stages to produce catalysts which have higher than normal activity in contaminant removal from hydrocarbon feed stocks, especially in both sulfur and nitrogen removal, which catalysts also contain relatively low or no acidic residues such as $P_2O_5$ and permit use of lower effective operating temperature for a predetermined percentage of contaminant removal, for example, at 85% removal of sulfur.

DETAILED DESCRIPTION OF THE INVENTION

The general method employed in this invention for the preparation of a hydrotreating catalyst includes the following two-step impregnation procedure.

a. Two impregnating solutions, "A" and "B", are prepared where "A" solution contains Group VIB and Group VIII metals with a very low level acid stabilization. Solution "B" is a Group VIII soluble salt solution.

b. An alumina or alumina-silica support material is impregnated with the "A" and "B" metal solutions or the equivalent.

c. The impregnated material, from Step b, is formed by any method known to the art and calcined.

d. The calcined material, from Step c, is reimpregnated with solution "A" and calcined a second time.

An essential feature of the invention is the preparation of "A" solution. This solution contains about three moles of Group VIB metal for every one mole of Group VIII metal, with low-level acid stabilization. In general terms, the stabilized "A" solution is prepared by mixing the requisite amounts of Group VIII and Group VIB metals in water with the acid stabilizer. The mixture is then heated and allowed to react sufficiently to give a clear solution. Normally, this takes several hours at 180° F. or higher. The volume of the solution may be adjusted with water to the desired concentration.

Some Group VIII metals suitable for use in the impregnating solution are the salts of iron, nickel or cobalt. Carbonate salts are preferred. Nickel carbonate is most preferred. Group VIB metals suitable for use in obtaining a stable solution are preferably molybdenum and tungsten oxides. Molybdenum trioxide is most preferred.

Acid stabilizers that could be used are carboxylic acids such as citric, gluconic, formic and acetic; and certain inorganic oxidic acids. Phosphoric acid is most preferred.

The preferred "A" solution is made with nickel carbonate, molybdenum trioxide and phosphoric acid. Ni-Mo solutions of 120 g/l in $MoO_3$ concentration, or less, were stable for 24 hours without the addition of phosphoric acid. For concentrations higher than 120 g/l $MoO_3$, it was necessary to add a small amount of phosphoric acid to stabilize the solution for 24 hours. The concentration of the metals in this "A" solution can be varied over a range from 17.5 g/l to 340 g/l $MoO_3$ with a maximum of 20.1 g/l $H_3PO_4$ required for stabilization. That is a maximum molar ratio of P/Mo of 0.087. As previously indicated, solution "B" is the aqueous solution of a soluble salt of a Group VIII metal. The citrate salt is preferred. Nickel citrate is most preferred.

Any alumina or alumina-silica support known to the art, as appropriate for hydrotreating, is applicable to this catalyst preparation.

Several methods of catalyst support impregnation are known to the art, (see, for example, U.S. Pat. No. 3,232,887). The preferred method for the first impregnation, in this catalyst preparation, is hydrothermal. However, other methods such as pore volume impregnation or co-mulling, are within the scope of this invention. The second-step impregnation may also include several methods known to the art for dispersing metals in a form support. The preferred methods for this invention are dipping or pore volume impregnation. The most preferred method is dipping.

The catalyst forming may be by any method known to the art. Extrusion and spheridizing are preferred methods.

The following examples are given to illustrate the method of the present invention and the effectiveness of the resulting catalyst for hydrotreating processes. The analytical and activity test results of all example catalyst are given in Table I.

EXAMPLE I

This example demonstrates the preparation of the impregnating solutions.

The solution "A" (288 g/l $MoO_3$, 47.5 g/l NiO and 12.4 g/l $P_2O_5$) having a molar ratio of Mo/Ni of 3.1467 was prepared as follows:

A slurry was made of 9000 ml $H_2O$ (70° F.) with 2880 g $MoO_3$ and 144 ml of 75% $H_3PO_4$. The nickel carbonate (820 g) was added over a period of 15 minutes. The mixture was heated, with agitation, to 200° F. and held at that temperature for two hours. A clear green solution was obtained. The solution had a pH of 3.0, with a P/Mo molar ratio of 0.087. The volume of the solution was adjusted to 10 liters with water. The solution was indefinitely stable (for at least six months at room temperature).

The solution "B" (106 g/l NiO) was prepared as follows:

Anhydrous citric acid (80 g) was dissolved in 350 ml $H_2O$ (75° F.). Nickel carbonate (73.3 g) was then added over a period of 15 minutes. The slurry was heated slowly to 180° F. with continual agitation. After one hour of reaction at 180° F., all the $NiCO_3$ was in solution and the pH was 3.8. The volume of the solution was adjusted to 400 ml with water.

Three variations of "A" type solutions were prepared to establish the range of phosphoric acid needed to obtain stable Ni-Mo solutions of various metal concentrations.

"A" (variation 1)—A Ni-Mo solution (Mo:Ni of 3.1457) of 120 g/l $MoO_3$ and 19.8 g/l NiO in metal concentration was prepared by the above "A" method. No phosphoric acid was added. In preparing the solution, 5400 ml $H_2O$ (80° F.), 720 g $MoO_3$ and 203 g $NiCO_3$ were slurried. The mixture was agitated and was heated to 190° F. After two hours at 190° F., a clear green solution was obtained. The volume of the solution was adjusted with water to 6000 ml. This solution was stable for about 24 hours after which a green solid precipitated.

"A" (variation 2)—This solution was prepared in the same manner as in variation 1, except that 36 ml of 75% $H_3PO_4$ was added to the final 6000 ml of solution. This solution (120 g/l $MoO_3$, 19.8 g/l NiO and 5.15 g/l $P_2O_5$) was stable for at least 45 days at room temperature. The P/Mo molar ratio of the solution was 0.087.

"A" (variation 3)—This solution was prepared following the procedure of solution "A", except that the amount of reactants was changed. The amounts were 900 ml $H_2O$, 340 g $MoO_3$, 96 g $NiCO_3$ and 17 ml of 75% $H_3PO_4$. The solution was adjusted with water to 1000 ml and found to be stable for at least 45 days. The P/Mo molar ratio of the solution was 0.087. The concentrations of the metal components in the final solution were 340 g/l $MoO_3$, 56 g/l NiO and 14.6 g/l $P_2O_5$, the Mo:Ni ratio being 3.1494.

EXAMPLE II

This example demonstrates the preparation of the catalyst of this invention. In this example, solution "A" of Example I is used which contains 288 g/l $MoO_3$ and has a P/Mo molar ratio of 0.087.

Thirty-five and three quarter pounds of alumina-silica carrier, containing 22% solids, were slurried in 4 liters of water. The alumina-silica contained 2.8% $SiO_2$ on a dry basis, with the balance essentially $Al_2O_3$. The slurry was mixed with 2,522 ml of solution "A" of Example I and 844 ml solution "B" of Example I. The slurry was heated to 200° F. and was held at 200° F. for one hour. After the impregnation, the slurry was filtered. The filtrate was saved. The filter cake was dried at 180° F. for two hours. The impregnated dried filter cake had a free moisture of 42%, where free moisture was determined on an O-Haus moisture meter using 10 g of sample which was heated for 20 minutes at a 75 setting. Eighteen pounds of the dried filter cake were charged to a Simpson muller. The filtrate (3800 ml) was added to the muller. The material was mulled for 20 minutes and then was extruded at 55% free moisture through a 0.073 inch die. The extrudates were predried at 300° F. for 3 hours and then calcined at 1100° F. for 2 hours. The calcined, impregnated extrudates, after the first impregnation, contained 17% $MoO_3$, 3.73% NiO and 0.78% $P_2O_5$ by weight. Five pounds of the above extrudate were dipped into 9080 ml solution "A" for 16 hours. After the impregnation, the solution was drained off and the impregnated catalyst was predried at 300° F. and then calcined at 1100° F. for two hours.

The finished catalyst contained 28% $MoO_3$, 6.4% NiO and 3.1% $P_2O_5$ by weight. Chemical analyses are given in Table I.

EXAMPLE III

This example serves as a comparison for Example II where the dipping time was reduced from 16 hours to 1 hour. All other catalyst preparation steps are the same as Example II. Analysis results are shown in Table I.

EXAMPLE IV

This example shows the effect of lower metals levels after the first impregnation. The catalyst were prepared in the same manner as the catalysts in Examples II and III, with the exception that the metals in the calcined extrudate after the first impregnation were 11.8% $MoO_3$, 3.51% NiO and 0.50% $P_2O_5$ by weight. After a one-hour dip, second impregnation, the finished catalyst contained 26.2% $MoO_3$, 5.59% NiO and 1.6% $P_2O_5$ by weight. The analytical results are given in Table I.

EXAMPLE VI

This example further reduces the metals after the first impregnation such that extrudate, after the first impregnation, contained 5.9% $MoO_3$, 3.08% NiO and 0.05% $P_2O_5$ by weight. In addition, the first stage metals impregnation was done by adding the metals as $MoO_3$, $NiCO_3$ and citric acid, in their solid form, rather than as solutions "A" and "B". In all other ways, the preparation of the finished catalyst followed the procedure described in Examples III and IV. The final catalyst contained 23.6% $MoO_3$, 5.76% NiO and 1.3% $P_2O_5$ by weight. The analytical results are tabulated in Table I.

EXAMPLE VII

This example shows the effect of eliminating the Group VIB metal entirely from the first impregnation step. The procedure of Example III and IV was followed, except that only nickel carbonate and citric acid were used in the impregnation of the alumina-silica support. The first-stage impregnated extrudates contained 2.85% NiO, and the second-stage impregnated catalyst contained 22.8% $MoO_3$, 5.85% NiO and 1.4% $P_2O_5$ by weight. Analytical results are shown in Table I.

EXAMPLE VIII

This example shows the effect of the solution concentration, in the final impregnation, on catalyst activity.

The calcined extrudates through the first-stage impregnation were prepared according to the procedure described in Example IV. In the second-stage impregnation, 454 g of the calcined extrudate were dipped into 1816 ml of impregnation solution "A" having a concentration of 200 g/l $MoO_3$ concentration (instead of 288 g/l in $MoO_3$ concentration as in Example IV). Analytical results are shown in Table I.

EXAMPLE IX

This catalyst was prepared by the same method as Examples IV and VI, except that the concentration of solution "A" was 120 g/l $MoO_3$ in the final impregnation step. Analytical results are shown in Table I.

EXAMPLE X

This example shows the use of pore volume impregnation in the second-stage of impregnation. The calcined extrudates obtained after the first-stage impregnation were prepared in a method similar to Example II to give a material containing 14.6% $MoO_3$, 4.55% NiO and 0.93% $P_2O_5$ by weight. This support (7302 g) was impregnated with 4,554 ml of solution "A" (288 g/l $MoO_3$) by introducing the liquid to a tumbling, evacuated bed of the extrudate. The impregnated extrudates were dried and calcined at 1100° F. for 2 hours. Analytical results are tabulated in Table I.

EXAMPLE XI

This example demonstrates the use of the invention catalysts for hydrotreating. Each of the catalysts of Examples II to VIII were tested for hydrotreating activity. The activities were determined in comparison to a commercial Ni-Mo hydrotreating catalyst. The analysis of the reference catalyst is given in Table I, Example XI. Sixty milliliters each of the experimental catalyst to be evaluated and the reference catalyst were tested for desulfurization and denitrogenation activity on a heavy vacuum gas oil (gravity API 20.0, boiling range 742°–1065° F.) containing 2.8% sulfur by weight and 1560 ppm nitrogen. The run conditions were 675° F., 1000 psig, 1.5 LHSV (vol oil/hr/vol catalyst) and 4100 scf/bbl hydrogen. The catalysts were charged to adjacent tube reactors in an isothermal sandbath.

The reference catalyst was assigned a standard activity value of 1.00 on a volume basis. The activities of the experimental catalysts are reported relative to this standard on a volume basis. The activity results are given in Table I.

EXAMPLE XI

The following example illustrates the superior activity maintenance of the invention catalyst when compared with a commercial Co-Mo catalyst when desulfurizing a blend of vacuum gas oil and vacuum residuum. This feed is more difficult to treat than vacuum gas oil or lighter distillates alone. The invention catalyst tested in this example was prepared by a procedure similar to that of Example II. The above catalysts (1/16" extrudate) were charged in equal volumes to identical electrically-heated pilot plant tubular reactors, given a standard presulfiding activation treatment and placed on stream, desulfurizing a feed blend as described below. Reactor temperatures were increased as required to maintain 85% desulfurization and the experiment continued at the conditions shown below for 24 days. The superior activity maintenance of the invention catalyst is shown by both a lower operating temperature and a smaller rate of temperature increase over the extended operating period.

| Feed Properties (Blend) | |
|---|---|
| Gravity, °API | 25.7 |
| Flash point, °F. (COC) | 305 |
| Ramsbottom Carbon, Wt. % | 1.91 |
| Sulfur, Wt. % | 0.62 |
| Nitrogen, Wt. % | 0.114 |
| Distillation, ASTM D-1160 | |
| IBP, °F. | 418 |
| 10% | 572 |
| 50% | 751 |
| 90% | 1055 |
| Run Conditions | |
| Start-of-run temperature, °F. | 690 |
| Reactor pressure, psig | 1225 |
| Oil liquid hourly space velocity/hr | 1.74 |
| Hydrogen/oil ratio, scf/bbl | 2000 |
| Invention Catalyst Properties | |
| $MoO_3$ | 27% |
| NiO | 6.7% |
| $P_2O_5$ | 2.25% |
| ABD | .92 gm/ml |

| | Activity Results | |
|---|---|---|
| | Temperature Required for 85% Desulfurization, °F. | |
| Days on Stream | Invention Catalyst | Reference Catalyst |
| 5 | 698 | 702 |
| 10 | 705 | 713 |
| 15 | 710 | 721 |
| 20 | 712 | 727 |
| 24 | 713 | 730 |

TABLE I

ANALYTICAL AND ACTIVITY RESULTS FOR HYDROTREATING CATALYSTS

| EXAMPLE | II | III | IV | V | VI | VII | VIII | IX |
|---|---|---|---|---|---|---|---|---|
| Metals Analysis After First Impregnation and Calcination (% by Weight) | | | | | | | | |
| $MoO_3$ | 17.0 | 17.0 | 11.8 | — | 11.8 | 11.8 | 1.46 | — |
| NiO | 3.73 | 3.73 | 3.51 | 2.85 | 3.51 | 3.51 | 4.55 | — |
| $P_2O_5$ | 0.78 | 0.78 | 0.50 | — | 0.50 | 0.50 | 0.93 | — |
| Metals Analysis After Second Impregnation (% by Weight) | | | | | | | | |
| $MoO_3$ | 28.0 | 25.4 | 26.2 | 22.8 | 23.2 | 21.1 | 23.8 | 19.9 |
| NiO | 6.41 | 5.29 | 5.59 | 5.85 | 5.24 | 5.0 | 5.61 | 5.4 |
| $P_2O_5$ | 3.1 | 1.7 | 1.6 | 1.4 | 1.5 | 1.2 | 1.7 | 6.3 |
| HDS Activity | | | | | | | | |
| Volume | 1.30 | 1.23 | 1.39 | 1.15 | 1.43 | 1.22 | 1.23 | 1.00 |
| HDN Activity | | | | | | | | |
| Volume | 1.16 | 1.19 | 1.29 | 1.09 | 1.17 | 1.07 | 1.0 | 1.0 |
| ABD g/ml | 0.93 | 0.89 | 0.91 | 0.86 | 0.87 | 0.82 | 0.85 | 0.88 |

Evaluation of Results

The examples illustrate several properties of the invention catalyst which are unique and support the objectives of this invention.

The data in Table I show that over a wide range of preparative conditions the invention catalyst gave activity superior to the commercial nickel-molybdenum catalyst in both denitrogenation and desulfurization. Further, in every case, the desulfurization activity was improved an additional four to twenty-six percent over the denitrogenation improvement. Example XI illustrates superior desulfurization activity, even to a commercial cobalt-molybdenum catalyst.

The Group VIB metal, added to the catalyst in the first step, varies from zero to 17%, with the best activity improvement occurring at the higher levels. (Examples II, III, IV, V, VI). The second-stage impregnation is illustrated either by dipping or by pore volume impregnation. In the dipping examples, the time varied from one to sixteen hours, (Examples II and III) and the dipping solutions varied from 120 g/ml $MoO_3$ to 288 g/l $MoO_3$ in concentration (Examples IV, VII and VIII).

In general, as shown by the examples, these catalysts should preferably contain 21–30% $MoO_3$, 5–7% NiO and 1.0–3.5% $P_2O_5$. The molar ratio of Group VIB metal to Group VIII metal of approximately 3.15:1 appears to be critical. The multiple stage impregnation of the catalyst carrier is also an important feature of the invention using impregnating solutions of the type herein described. In addition, significant improvement has been obtained by using the dipping method of impregnation as distinguished from other methods such as pore volume impregnation.

The ability of a catalyst to desulfurize a hydrocarbon feedstock at a predetermined high rate of desulfurization with lower temperatures as demonstrated by Example XI is a very important factor in processes of this type because the use of lower temperatures results in lower costs.

The invention is hereby claimed as follows:

1. A process of preparing a hydrotreating catalyst which consists essentially in the following steps:
   (a) reacting molybdenum trioxide ($MoO_3$) and a carbonate of a Group VIII metal from the group consisting of nickel and cobalt by heating them in an aqueous slurry containing phosphoric acid, the quantity of $MoO_3$ being in the range of 120 g/l to 340 g/l, the molar ratio of Mo to Group VIII metal being approximately 3.15:1, and the P/Mo molar ratio being approximately 0.087, the heating being carried out until a clear solution "A" is obtained;
   (b) separately preparing an aqueous solution of a compound of a Group VIII metal from the group consisting of nickel and cobalt by heating an aqueous slurry of a carbonate of a Group VIII metal from the group consisting of nickel and cobalt in the presence of citric acid until a clear solution "B" is obtained;
   (c) impregnating hydrothermally, in a first stage, a hydrotreating catalyst carrier of alumina or alumina-silica containing a minor amount of silica with solution "A" and solution "B", the relative proportion of solution "A" being substantially greater than the proportion "B", the amount and time of impregnation being sufficient to produce in the first stage after calcination an impregnated catalyst carrier containing up to 17.0% by weight $MoO_3$, 2.85 to 4.55% by weight oxide of Group VIII metal and 0.50 to 0.93% by weight $P_2O_5$;
   (d) filtering, semi-drying, forming and calcining the resultant product from said first stage;
   (e) in a second stage, impregnating by dipping for an extended period of time the formed and calcined product from the first stage with solution "A", the amount and time of impregnation with said solution in said second stage being sufficient to produce, after drying and calcination, a catalyst containing by weight 21–30% $MoO_3$, 5–7% oxide of Group VIII metal, and 1.0–3.5% $P_2O_5$; and
   (f) drying and calcining said catalyst.

2. A process as claimed in claim 1 in which the Group VIII metal is nickel.

3. A process as claimed in claim 1 in which the Group VIII metal is cobalt.

4. A process of preparing a hydrotreating catalyst which consists essentially in the following steps:
   (a) reacting molybdenum trioxide ($MoO_3$) and a carbonate of a Group VIII metal from the group consisting of nickel and cobalt by heating them in an aqueous slurry containing phosphoric acid, the quantity of $MoO_3$ being in the range of 120 g/l to 340 g/l, the molar ratio of Mo to Group VIII metal being approximately 3.15:1, and the P/Mo molar ratio being approximately 0.087, the heating being carried out until a clear solution "A" is obtained;
   (b) separately preparing an aqueous solution of a compound of a Group VIII metal from the group consisting of nickel and cobalt by heating an aqueous slurry of a carbonate of a Group VIII metal from the group consisting of nickel and cobalt in the presence of citric acid until a clear solution "B" is obtained;
   (c) impregnating hydrothermally, in a first stage, a hydrotreating catalyst carrier of alumina or alumina-silica containing a minor amount of silica with solution "B" alone, the amount and time of impregnation being sufficient to produce in the first stage after calcination an impregnated catalyst carrier containing up to and including 2.85% by weight oxide of Group VIII metal;
   (d) filtering, semi-drying, forming and calcining the resultant product from said first stage;
   (e) in a second stage, impregnating by dipping for an extended period of time the formed and calcined product from the first stage with solution "A", the amount and time of impregnation with said solution in said second stage being sufficient to produce, after drying and calcination, a catalyst containing by weight 21–30% $MoO_3$, 5–7% oxide of Group VIII metal, and 1.0–3.5% $P_2O_5$; and
   (f) drying and calcining said catalyst.

5. A process as claimed in claim 4 in which the Group VIII metal is nickel.

6. A process as claimed in claim 4 in which the Group VIII metal is cobalt.

* * * * *

UNITED STATES PATENT AND TRADEMARK OFFICE
CERTIFICATE OF CORRECTION

PATENT NO. : 4,444,905            Page 1 of 2

DATED : April 24, 1984

INVENTOR(S) : George N. Pessimisis

It is certified that error appears in the above-identified patent and that said Letters Patent is hereby corrected as shown below:

On the title page, Assignee should read

-- Katalco Corporation --.

Column 2, line 43, after "then" insert --extruded and calcined--.

Column 6, line 6, change "were" to --was--.

Column 6, line 15, cancel "EXAMPLE VI"; cancel line 16 through line 26.

Column 6, change "EXAMPLE VII" to read --EXAMPLE V--;
Column 6, change "EXAMPLE VIII" to read --EXAMPLE VI--;
Column 6, change "EXAMPLE IX" to read -- EXAMPLE VII--;
Column 6, change "EXAMPLE X" to read --EXAMPLE VIII--;

Column 7, line 1, change "EXAMPLE XI" to read --EXAMPLE IX--.
Column 7, line 9, change "XI" to read --IX--.
Column 7, line 23, change "EXAMPLE XI" to read --EXAMPLE X--.

Column 8, line 60, change "XI" to read --X--.
Column 8, line 66, change "V, VI" to read --VI, VII--.

UNITED STATES PATENT AND TRADEMARK OFFICE
CERTIFICATE OF CORRECTION

PATENT NO. : 4,444,905　　　　　　　　　　　　　　　Page 2 of 2
DATED　　　 : April 24, 1984
INVENTOR(S) : George N. Pessimisis It is certified that error appears in the above-identified patent and that said Letters Patent is hereby corrected as shown below:

Column 9, line 3, change "VII and VIII" to read -- VI and VII --.

Column 9, line 18, change "XI" to read -- X --.

*Signed and Sealed this*

*Twenty-sixth* Day of *March 1985*

[SEAL]

*Attest:*

DONALD J. QUIGG

*Attesting Officer*　　　*Acting Commissioner of Patents and Trademarks*